(12) United States Patent
Gill

(10) Patent No.: US 10,906,459 B2
(45) Date of Patent: Feb. 2, 2021

(54) UNDER-HOOD LUMINAIRE

(71) Applicant: Joe Gill, Kennesaw, GA (US)

(72) Inventor: Joe Gill, Kennesaw, GA (US)

( * ) Notice: Subject to any disclaimer, the term of this patent is extended or adjusted under 35 U.S.C. 154(b) by 0 days.

(21) Appl. No.: 16/440,683

(22) Filed: Jun. 13, 2019

(65) Prior Publication Data

US 2019/0381934 A1 Dec. 19, 2019

Related U.S. Application Data

(60) Provisional application No. 62/684,544, filed on Jun. 13, 2018.

(51) Int. Cl.
| | |
|---|---|
| *F21V 17/10* | (2006.01) |
| *B60Q 3/35* | (2017.01) |
| *F21S 4/24* | (2016.01) |
| *F21Y 115/10* | (2016.01) |

(52) U.S. Cl.
CPC .............. *B60Q 3/35* (2017.02); *F21S 4/24* (2016.01); *F21V 17/108* (2013.01); *F21Y 2115/10* (2016.08)

(58) Field of Classification Search
CPC ................... B60Q 3/35; F21V 17/108
See application file for complete search history.

(56) References Cited

U.S. PATENT DOCUMENTS

| | | | | |
|---|---|---|---|---|
| 4,197,573 A | * | 4/1980 | Thatch .................... | F21L 14/00 362/241 |
| 6,799,863 B2 | * | 10/2004 | Offiler ................... | F21L 14/026 362/217.16 |
| 9,010,550 B2 | * | 4/2015 | Figueroa .............. | F16M 13/022 211/105.1 |
| 2007/0247851 A1 | * | 10/2007 | Villard ..................... | F21K 9/00 362/294 |
| 2012/0182749 A1 | * | 7/2012 | MacGregor ............. | F21L 14/02 362/486 |

* cited by examiner

*Primary Examiner* — Joseph L Williams
*Assistant Examiner* — Jacob R Stern
(74) *Attorney, Agent, or Firm* — Thomas | Horstemeyer, LLP.; Jason M. Perilla

(57) ABSTRACT

Various aspects and embodiments of under-hood luminaires are described. In one example, an under-hood luminaire includes a luminaire frame assembly. The luminaire frame assembly includes support braces and a number of cross members secured to the support braces in a spaced-apart configuration. The cross members include mounting surfaces, and light strips are secured to the mounting surfaces. The luminaire also includes a contraction hook assembly that can be used to secure the under-hood luminaire to the hood of an automobile. The luminaire can be relied upon to uniformly illuminate the engine compartment of the automobile, helping to eliminate lost productivity and frustration for mechanics.

20 Claims, 6 Drawing Sheets

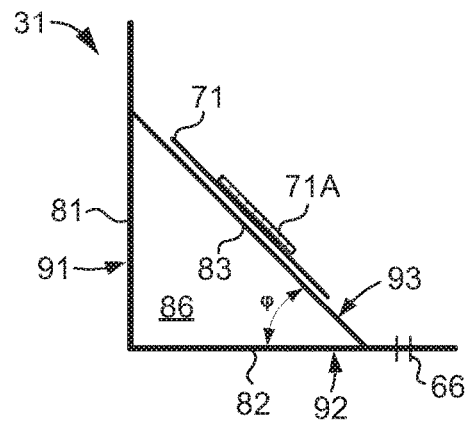
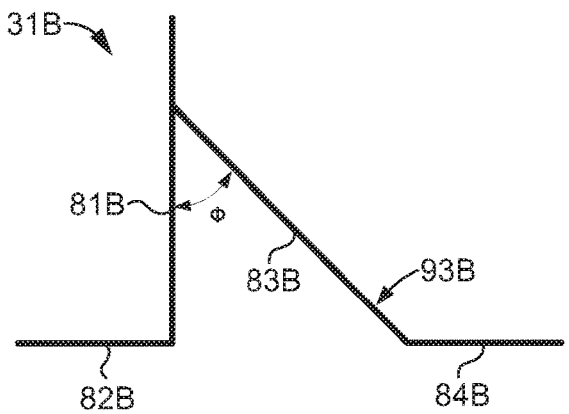
*FIG. 4A*  *FIG. 4B*
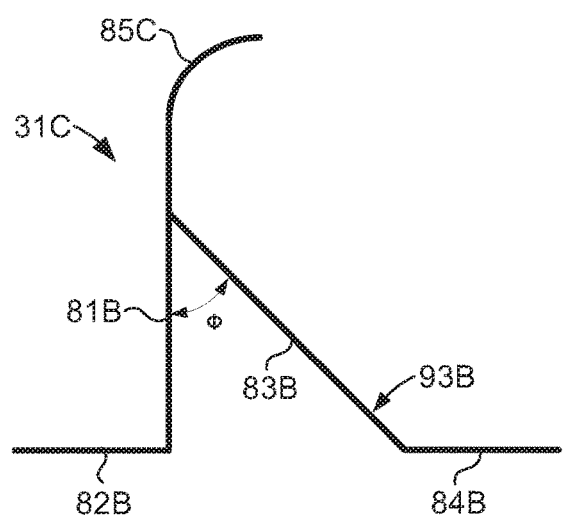
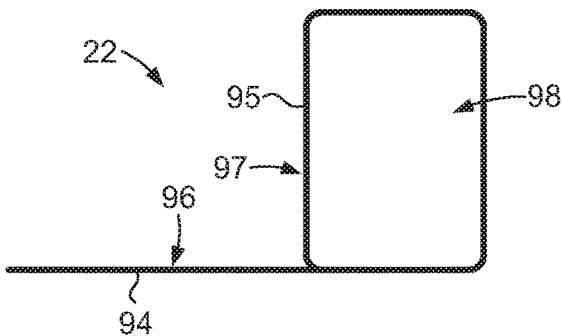
*FIG. 4C*  *FIG. 4D*

UNDER-HOOD LUMINAIRE

CROSS-REFERENCE TO RELATED APPLICATIONS

This application claims the benefit of U.S. Provisional Application No. 62/684,544, titled "UNDER-HOOD LUMINAIRE," filed Jun. 13, 2018, the entire contents of which is hereby incorporated herein by reference.

BACKGROUND

Sufficient lighting is an important factor for both the safety and health of workers and also for increased speed in manual operations. Poor lighting can cause symptoms such as eyestrain, headaches, fatigue, irritability, and frustration. Several different types of luminaires or light fixtures are available for use in workshops, garages, factories, and other areas where manual work is being performed. Many of these luminaires are designed for a specific task or user, such as for plumbers, painters, mechanics, and other users preforming specific tasks.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIGS. 4A-4C illustrate cross-sectional views of example cross members of the under-hood luminaire shown in FIG. 1 according to aspects of the embodiments described herein.

FIG. 4D illustrates a cross-sectional view of an example support brace of the under-hood luminaire shown in FIG. 1 according to aspects of the embodiments described herein.

DETAILED DESCRIPTION

As noted above, several different types of luminaires or light fixtures are available for use in workshops, garages, factories, and other areas where manual work is being performed. Many of these luminaires are designed for a specific task or user, such as for plumbers, painters, mechanics, and other users. As one example, certain under-hood luminaires are designed to illuminate the engine compartments of automobiles for mechanics. Engine compartments of automobiles can be particularly difficult to illuminate because they are typically crowded with several different types of automotive systems, which often include a large number of molded black plastic parts. When a luminaire including a single light source is used to illuminate an engine compartment, the overlapping and interconnected nature of the parts results in a significant number of shadows and dark areas. The inability of conventional under-hood luminaires to uniformly illuminate engine compartments has resulted in a significant amount of lost productivity and frustration for mechanics.

Figure 1:
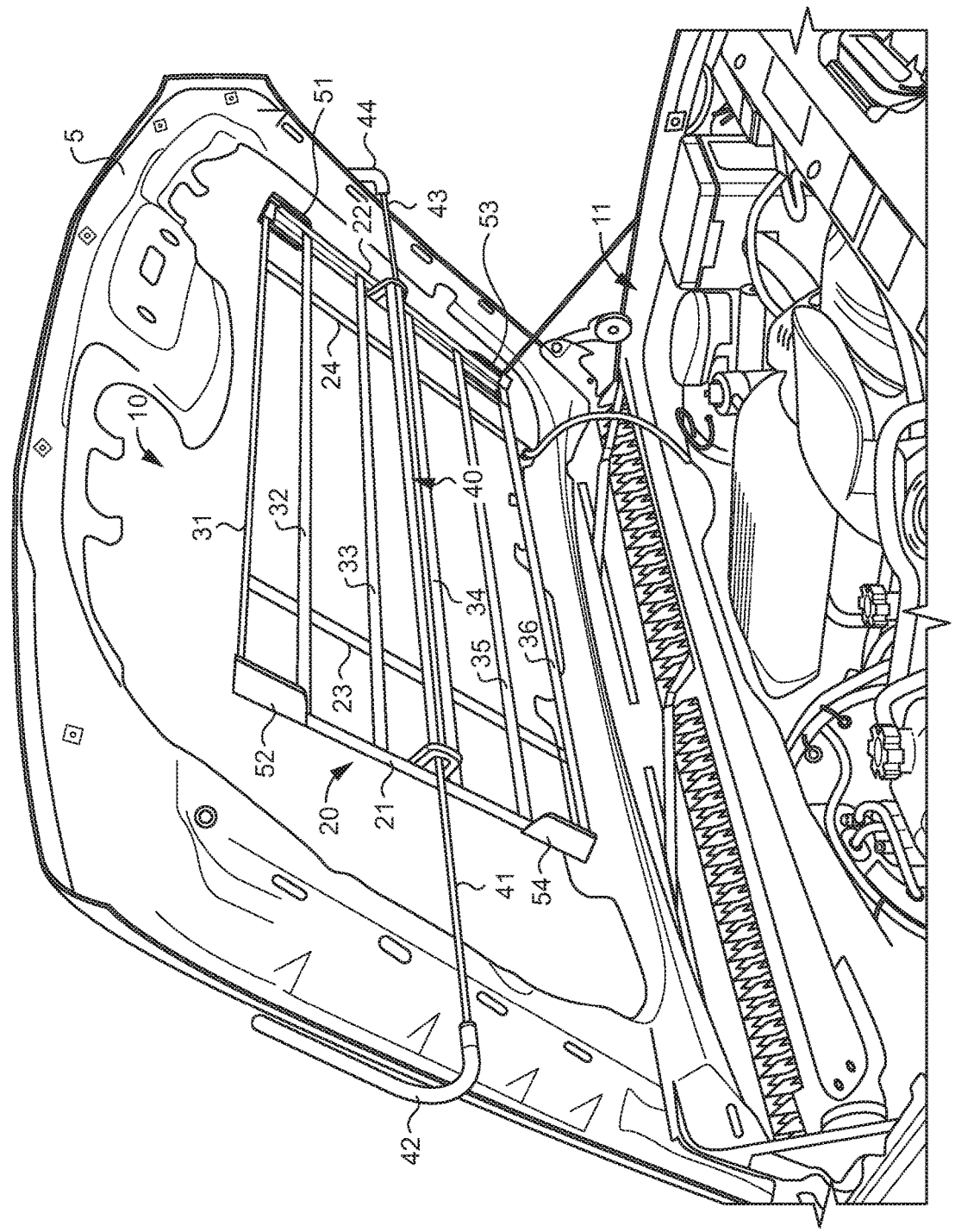
FIG. 1 illustrates an under-hood luminaire mounted to an automobile hood according to aspects of the embodiments described herein.

In the context outlined above, FIG. 1 illustrates an under-hood luminaire 10. The luminaire 10 is mounted to an automobile hood 5, as one example use case, although the luminaire 10 can be used to illuminate other compartments for other purposes. As shown in FIG. 1, the luminaire 10 illuminates an engine compartment 11 of an automobile. The luminaire 10 is shown as a representative example in FIG. 1. In other cases, the luminaire 10 can be larger or smaller in size, include additional or fewer components, and be used for different purposes.

The luminaire 10 includes a frame assembly. The frame assembly includes a number of support braces 21-24, including end support braces 21 and 22 and offset support braces 23 and 24. Additional (or fewer) support braces can be used in other embodiments. The frame assembly of the luminaire 10 also includes a number of cross members 31-36. Additional (or fewer) cross members can be used in other embodiments. The cross members 31-36 can be secured with or to the support braces 21-24, as described in further detail below, using any suitable fasteners or fastening means. The luminaire 10 also includes a contraction hook assembly 40 to secure the luminaire 10 to the hood 5, for example, or other locations depending upon the use case. The contraction hook assembly 40 is secured to the frame assembly of the luminaire 10. In the example shown in FIG. 1, the contraction hook assembly 40 is secured to the end support braces 21 and 22.

The contraction hook assembly 40 includes telescopic hook arms 41 and 43, respectively, having hook ends 42 and 44. Although not directly visible in FIG. 1, the luminaire 10 also includes a number of light strips secured to mounting surfaces of the cross members 31-36. In the example shown in FIG. 1, the telescopic hook arms 41 and 43 have been pulled out from guide tubes of the contraction hook assembly 40 and hooked onto right and left edges or sides of the hood 5. When pulled or extended out from the contraction hook assembly 40, the telescopic hook arms 41 and 43 are maintained under tension by tension springs within the contraction hook assembly 40. The tension springs act to pull or bias the telescopic hook arms 41 and 43 back into the guide tubes of the contraction hook assembly 40. In that way, the telescopic hook arms 41 and 43 can secure the luminaire 10 to the automobile hood 5. In one example, the contraction hook assembly 40 can be mounted at a location along the end support braces 21 and 22 so that the top end of the frame assembly contacts the hood 5 when the luminaire 10 is secured to the hood 5. Alternatively, the contraction hook assembly 40 can be mounted so that the bottom end of the frame assembly contacts the hood 5 when the luminaire 10 is secured to the hood 5. The contraction hook assembly 40 is described in further detail with reference to FIG. 5 below.

When mounted to the automobile hood 5, the light strips of the luminaire 10 are directed to provide downlight illumination over a wide area of the engine compartment 11. The luminaire 10 is designed to provide downlight illumination without (or mostly without) emitting or casting light into the eyes of a mechanic looking into the engine compartment 11 at standing height. Because the illumination is provided separately from a number of light strips secured to the cross members 31-36, the illumination originates from several different positions, depths, and/or directions to minimize shadows within the engine compartment 11. The illumination is also brighter and more evenly distributed as compared to conventional under-hood luminaires, which often rely upon a single source of light. Additional aspects and features of the luminaire 10 are described in further detail below.

The support braces 21-24 and cross members 31-36 can be formed from any suitable material(s), including metals, woods, plastics, composites, or combinations thereof. In one example case, the support braces 21-24 and cross members 31-36 can be formed from aluminum. The support braces 21-24 and cross members 31-36 can be formed from bar stock or extruded aluminum, for example, among other materials formed using other techniques. Certain faces or surfaces of the support braces 21-24 and/or cross members 31-36 can be painted or coated with a black or near-black paint, powder, or other coating to reduce reflections.

The support braces 21-24, cross members 31-36, and contraction hook assembly 40 can be secured together using any suitable fasteners or fastening means, such as snaps, screws, bolts, rivets, adhesives, other fasteners or fastening means, and combinations thereof.

Figure 2:
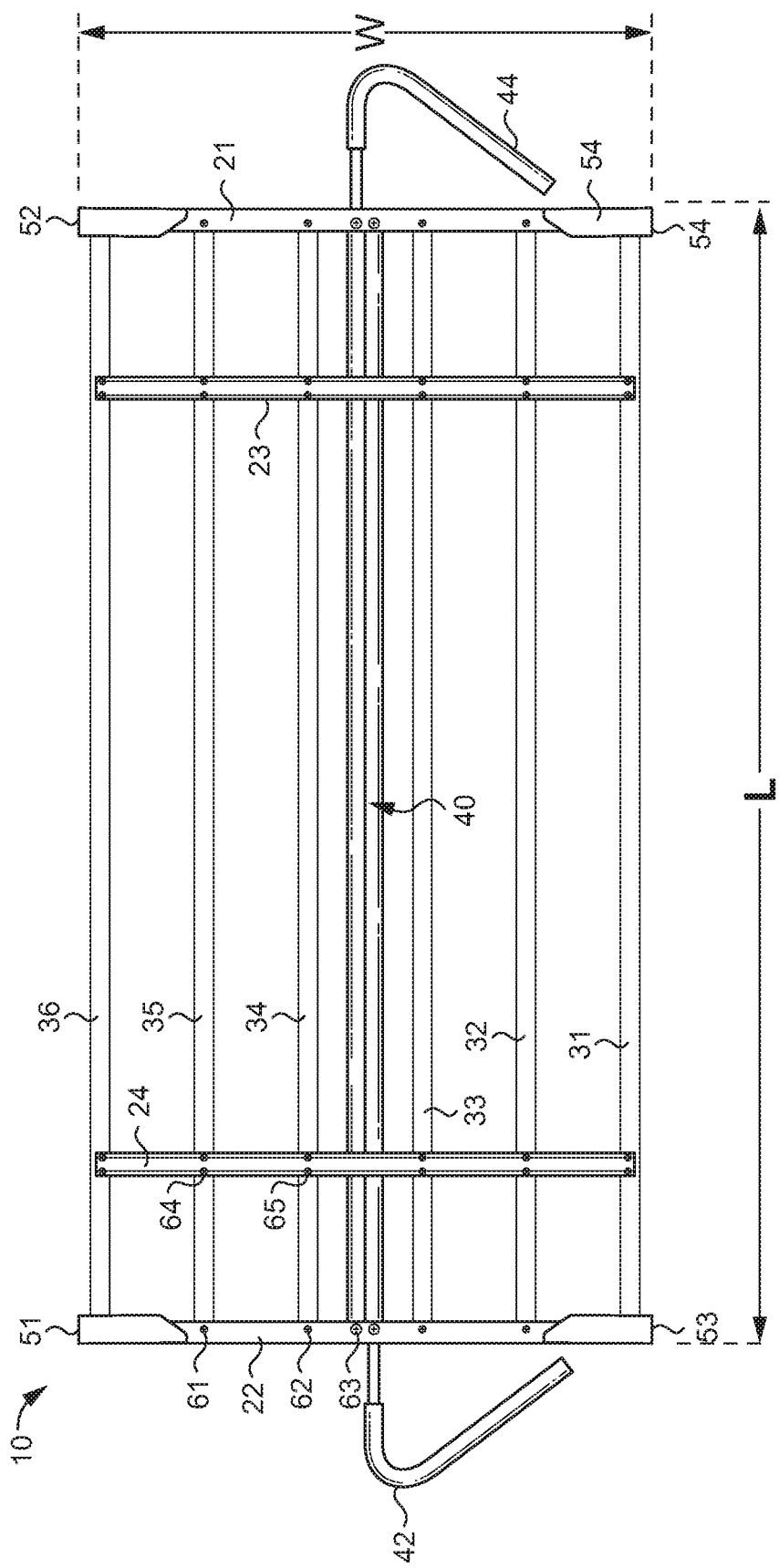
FIG. 2 illustrates a plan view of the top side of the under-hood luminaire shown in FIG. 1 according to aspects of the embodiments described herein.

FIG. 2 illustrates a plan view of the top of the luminaire 10 shown in FIG. 1. In FIG. 2, the luminaire 10 is shown having a width "W" and a length "L". Example dimensions of the luminaire 10 include widths "W" between 16-40 inches and lengths "L" between 18-48 inches, although other suitable dimensions can be relied upon.

In addition to the components identified in FIG. 1, FIG. 2 also illustrates the end caps 51-54 and the fasteners 61-65, among other fasteners not individually referenced. The end caps 51-54 are secured to the support braces 21 and 22 at the corners of the luminaire 10. The end caps 51-54 can be embodied as caps, bumpers, or feet formed from rubber, plastic, felt, or other suitable materials and can be press- or friction-fit secured to the distal ends of the support braces 21 and 22, as described in further detail below. If necessary, the end caps 51-54 can also be secured to the distal ends of the support braces 21 and 22 using any suitable adhesives, fasteners, or other fastening means. Additional bumpers, caps, or other standoffs for clearance can also be secured to the top side of the luminaire 10 at other locations.

The fasteners 61-65 are illustrated as rivets in FIG. 2, although other types of fasteners can be used. As shown, the fasteners 61 and 64, respectively, secure the support braces 21 and 23 to the cross member 35. Further, the fasteners 62 and 65, respectively, secure the support braces 21 and 23 to the cross member 35. Additionally, the fastener 63 secures one end of the contraction hook assembly 40 to the support brace 21. The additional fasteners illustrated but not individually referenced in FIG. 2 can also be relied upon to secure the other members or components of the luminaire 10 together as can be appreciated. As alternatives to the use of rivets, the support braces 21-24, cross members 31-36, and contraction hook assembly 40 can be secured together using snaps, screws, bolts, adhesives, other fasteners or fastening means, and combinations thereof.

As best shown in FIG. 2, the support braces 21-24 extend parallel to each other, the cross members 31-36 extend parallel to each other, and the support braces 21-24 extend perpendicular (i.e., at a right angle) to the cross members 31-36 when the luminaire 10 is assembled. In other embodiments, the support braces 21-24 and the cross members 31-36 can extend at other directions and/or angles with respect to each other.

Figure 3:
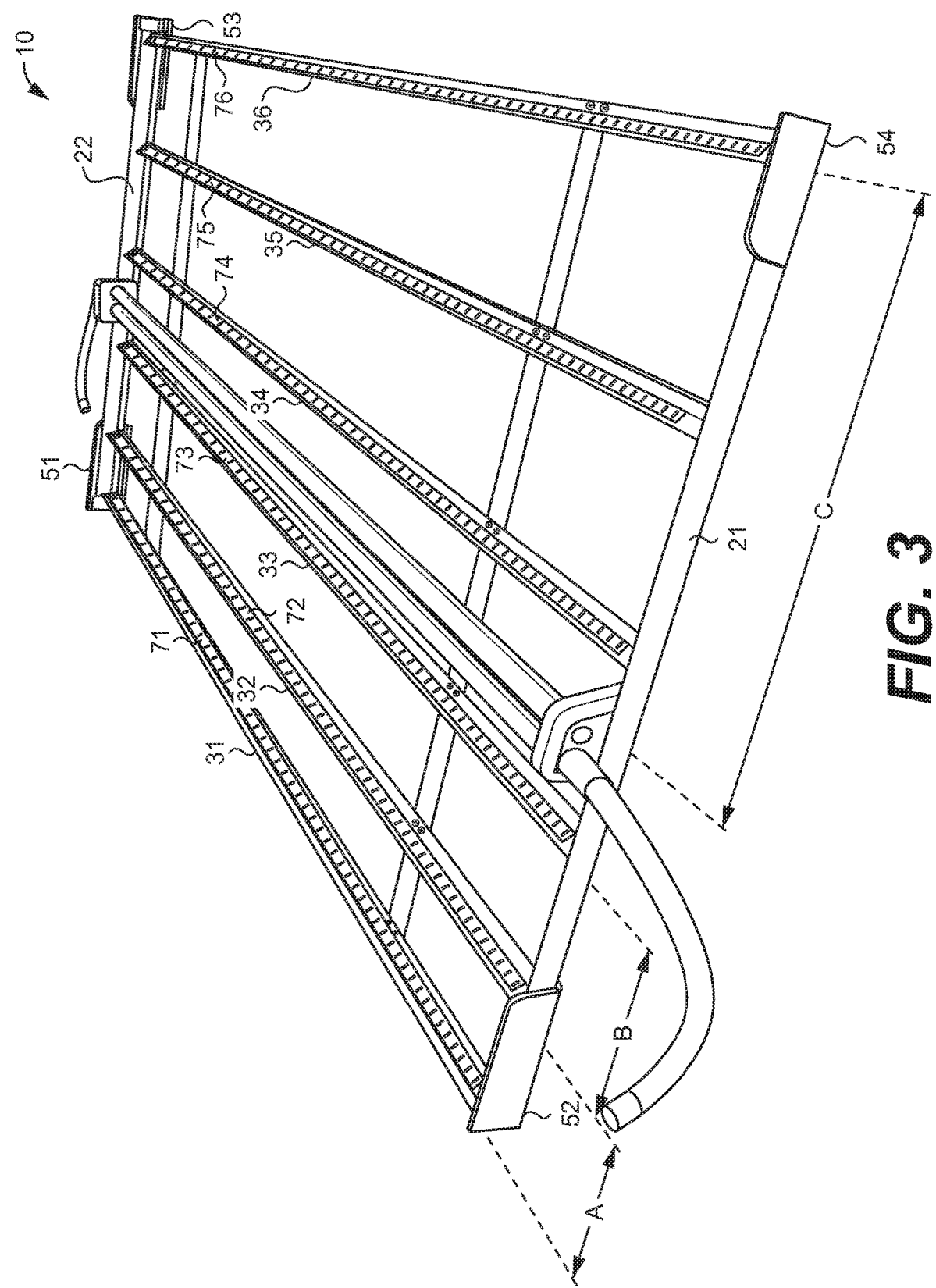
FIG. 3 illustrates a perspective view of an underside of the under-hood luminaire shown in FIG. 1 according to aspects of the embodiments described herein.

FIG. 3 illustrates a perspective view of an underside of the under-hood luminaire 10 shown in FIG. 1 according to aspects of the embodiments described herein. In this view, the light strips 71-76 can be seen extending along the cross members 31-36, respectively. The light strips 71-76 can be embodied as flexible light emitting diode (LED) light strips including a number of surface-mount device (SMD) LED modules. Example SMD LED modules include the 3528, 5050, 3014, 3020, and 2835 LED modules, among others, although other suitable LED modules or light strips can be used. The SMD LED modules can be selected in any suitable white color temperature between 2400 and 6200 degrees Kelvin (K), for example. In other cases, red, green, or blue SMD LED modules can be used. The light strips can be covered in a protective, waterproof covering in some cases.

One or more wires can be fed through a tube formed in the support brace 22 to supply power to the light strips 71-76. The support brace 22 can be embodied as an extruded tube having a cross-sectional "P" profile with an enclosed tube or channel in one example, as described in further detail below with reference to FIG. 4D. The wires can extend within the enclosed tube of the support brace 22 and out through holes drilled or otherwise formed in the tube at locations where the cross members 31-36 are secured to the support brace 22. Individual ones of the wires can then be soldered or otherwise electrically connected to one end of the light strips 71-76 to supply power to the light strips 71-76. In one example, a female-style power plug, such as direct current (DC) power plug or connector, can also be fitted into the support brace 22 (or at any other suitable position on the luminaire 10). The wires from the light strips 71-76 can be routed to the DC power plug in the support brace 22 for connection to a power source. A cord with alligator clips at one end and a male-style DC power plug at another end can then be used to supply power to the luminaire 10. In that example, the alligator clips can be connected to the terminals of a battery of an automobile, and the male-style DC power plug can be connected to the female-style DC power plug on the luminaire 10. In other embodiments, the light strips 71-76 can be wired for power in other suitable ways.

As also designated in FIG. 3, the cross member 31 is spaced-apart by the distance "A" from the cross member 32 between the support braces 21 and 22, and the cross member 32 is spaced-apart by the distance "B" from the cross member 33 between the support braces 21 and 22. In various embodiments, the distances "A" and "B" can be the same (or nearly the same), and the distances between all the cross members 31-36 can be the same. In that case, the cross members 31-36 can be secured to the support braces 21-24 in an evenly spaced-apart configuration. As an alternative, the distance "A" can be smaller than the distance "B" (or vice versa), and the distances between respective adjacent ones of the cross members 31-36 can be different than each other. In that case, the cross members 31-36 can be secured to the support braces 21-24 in an unevenly spaced-apart configuration.

The contraction hook assembly 40 is spaced-apart from one end of the support braces 21 and 22 by the distance "C". In one example, the distance "C" can be selected to secure the contraction hook assembly 40 to a proximate center of gravity of the luminaire 10. In another example, the distance "C" can be selected to secure the contraction hook assembly 40 at a point apart from the proximate center of gravity of the luminaire 10. In that case, the contraction hook assembly 40 can be mounted at a location along the end support braces 21 and 22 so that the top end of the frame assembly contacts the hood 5 (FIG. 1) when the luminaire 10 is secured to the hood 5 as shown in FIG. 1. Alternatively, the contraction hook assembly 40 can be mounted so that the bottom end of the frame assembly contacts the hood 5 (FIG. 1) when the luminaire 10 is secured to the hood 5.

FIGS. 4A-4C illustrate cross-sectional views of example cross members 31-36 of the under-hood luminaire 10 shown in FIG. 1 according to aspects of the embodiments described herein. Turning first to FIG. 4A, a cross-sectional view of the cross member 31, as a representative example of the cross members 31-36, is shown. The cross member 31 includes a first side member 81, a second side member 82 that extends perpendicular to the first side member 81, and a mounting member 83 that extends between the first side member 81 and the second side member 82 at an angle φ with respect to the second side member 82. The angle φ can be about 45° in one embodiment, although other angles can be relied upon. The cross member 31 can be secured to one or more of the support braces 21-24 using a rivet 66 through the second side member 82 as shown in FIG. 4A. Alternatively, the cross member 31 can be secured to one or more of the support braces 21-24 using a rivet through the first side member 81.

The first side member 81 includes an outer surface 91, and the second side member 82 includes an outer surface 92. The outer surfaces 91 and 92 can be painted or coated with a black or near-black paint, powder, or other coating to reduce reflections and the visual "footprint" of the luminaire 10 for users. Other surfaces of the cross member 31 can either remain unfinished, in which case the other surfaces may be reflective or partially reflective, such as if the cross member 31 is formed from extruded aluminum. In other cases, all surfaces of the cross member 31 coated with a black or near-black paint, powder, or other coating to reduce reflections.

The mounting member 83 includes an outer mounting surface 93 to which the light strip 71 is secured. The light strip 71 can be secured to the mounting surface 93 using an adhesive backing on one side of the light strip 71, for example, or using mechanical fasteners or other suitable means. The light strip 71 includes a number of SMD LED modules, including the SMD LED module 71A, among others.

Turning to FIG. 4B, a cross-sectional view of a cross member 31B is shown. As compared to the cross member 31, the cross member 31B does not include the enclosed area 86 (see FIG. 4A). Thus, the cross member 31B can be easier to manufacture as an extrusion as compared to the cross member 31, because it omits the enclosed area 86.

The cross member 31B includes a first side member 81B, a first leg member 82B that extends perpendicularly from one end of the first side member 81B, a mounting member 83B that extends at an angle Φ from the first side member 81B, and a second leg member 84B that extends from one end of the mounting member 83B. The angle Φ can be about 45° in one embodiment, although other angles can be relied upon.

The mounting member 83B includes an outer mounting surface 93B to which the light strip 71, for example, can be secured. The cross member 31B can be secured to one or more of the support braces 21-24 using one or more rivets through the first leg member 82B and/or the second leg member 84B.

One or more outer surfaces of the first side member 81B, the first leg member 82B, the second leg member 84B, and parts of the cross member 31B can be painted or coated with a black or near-black paint, powder, or other coating to reduce reflections and the visual "footprint" of the luminaire 10 for users.

Turning to FIG. 4C, a cross-sectional view of a cross member 31C is shown. As compared to the cross member 31B, the cross member 31C includes a curved lip edge 85C that extends from one end of the first side member 81B. The curved lip edge 85C can help to prevent light from a light strip mounted to the outer mounting surface 93B from shining into the eyes of a user of the luminaire 10 when it is installed for use on the hood 5.

While the cross members 31-36 of the luminaire 10 shown in FIGS. 1-3 each have the cross-sectional profile shown in FIG. 4A, cross members having the cross-sectional profiles shown in FIGS. 4B and 4C can also be used. The luminaire 10 can also be formed with cross members having a combination of the cross-sectional profiles shown in FIGS. 4A-4C. As one example, one or both of the cross members 31 and 32 can have the cross-sectional profile shown in FIG. 4C, to prevent light from shining into the eyes of a user, while the other cross members 33-36 can have the cross-sectional profile shown in FIG. 4B.

FIG. 4D illustrates a cross-sectional view of the support brace 22 of the under-hood luminaire 10 shown in FIG. 1 according to aspects of the embodiments described herein. The support brace 22 includes an extension arm 94 that extends off of one side of a tube 95. Thus, as shown, the support brace 22 can have a cross-sectional "P" profile with the extension arm 94 extending off the tube 95. An enclosed area 98 is formed within the tube 95. The cross members 31-36 can be secured at locations along the surface 96 of the extension arm 94. For example, a portion of the outer surface 92 (FIG. 4A) of the cross member 31 (i.e., a portion at a distal end of the cross member 31) can be placed against the surface 96 of the extension arm 94 shown in FIG. 4D. In that arrangement, the cross member 31 can be secured to the support brace 22 using a rivet 66 (FIG. 4A) that passes through the second side member 82 of the cross member 31 and through the extension arm 94 of the support brace 22. Alternatively, screws, adhesives, or other suitable fasteners or fastening means can be used to secure one end of the cross member 31 to the support brace 22. The cross members 31B and/or 31C can also be secured at locations along the surface 96 of the extension arm 94 in a similar way.

Although not separately shown, the support brace 21 can have a cross-sectional "L" profile, similar to the first and second side members 81 and 82 of the cross member 31 (but without the mounting member 83). At distal ends opposite those secured to the support brace 22, the cross members 31-36 can be secured at locations along the support brace 21, as shown in FIGS. 1-3.

Referring again to FIG. 4D, wires can extend within the enclosed area 98 of the support brace 22. One or more of the wires can extend out through holes drilled or otherwise formed through the side surface 97 of the tube 95, extending from within the enclosed area 98 to outside the tube 95, at suitable locations where the cross members 31-36 are secured to the extension arm 94. Individual ones of the wires can then be soldered or otherwise electrically connected to one end of the light strips 71-76 to supply power to the light strips 71-76.

Figure 5:
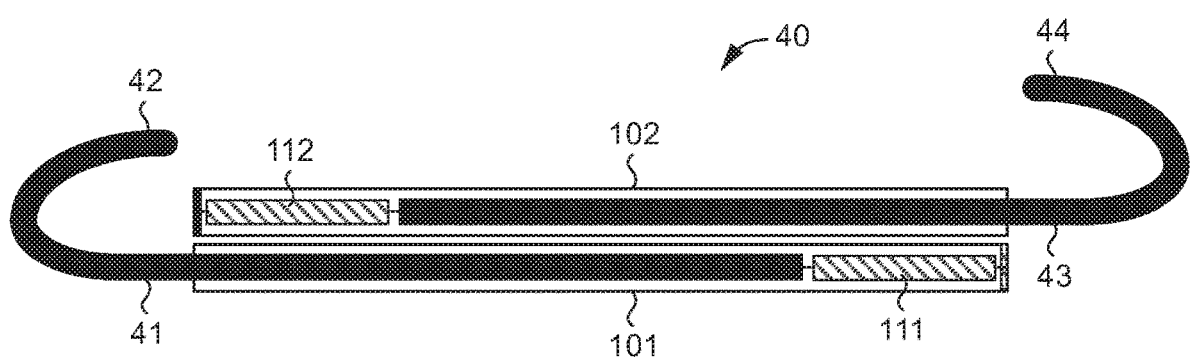
FIG. 5 illustrates an example contraction hook assembly of the under-hood luminaire shown in FIG. 1 according to aspects of the embodiments described herein.

FIG. 5 illustrates an example contraction hook assembly 40 of the under-hood luminaire 10 shown in FIG. 1 according to aspects of the embodiments described herein. FIG. 5 provides a representative example of certain components of the contraction hook assembly 40. The contraction hook assembly 40 is not necessarily drawn to scale in FIG. 5 and may include additional components not illustrated.

As shown, the contraction hook assembly 40 includes a first guide tube 101 and a second guide tube 102. The telescopic hook arms 41 and 43, respectively, having hook ends 42 and 44, can slide into and out from the guide tubes 101 and 102. The contraction hook assembly 40 also includes a first tension spring 111 secured within the first guide tube 101 at one end and secured at another end to the telescopic hook arm 41. The contraction hook assembly 40 also includes a second tension spring 112 secured within the second guide tube 102 at one end and secured at another end to the telescopic hook arm 43.

The telescopic hook arm 41 can be pulled out from the first guide tube 101 in a first linear direction under tension by the first tension spring 111, and the telescopic hook arm 43 can be pulled out from the second guide tube 102 in a second linear direction under tension by the second tension spring 112, where the first linear direction is opposite the second linear direction. As also shown in FIG. 1, the telescopic hook arm 41 includes the hook end 42 to catch a left edge of the hood 5, and the telescopic hook arm 43 includes the hook end 44 to catch a right edge of the hood 5. Under tension due to the tension springs 111 and 112, the telescopic hook arms 41 and 43 can secure the luminaire 10 to the hood 5.

Figure 6A:
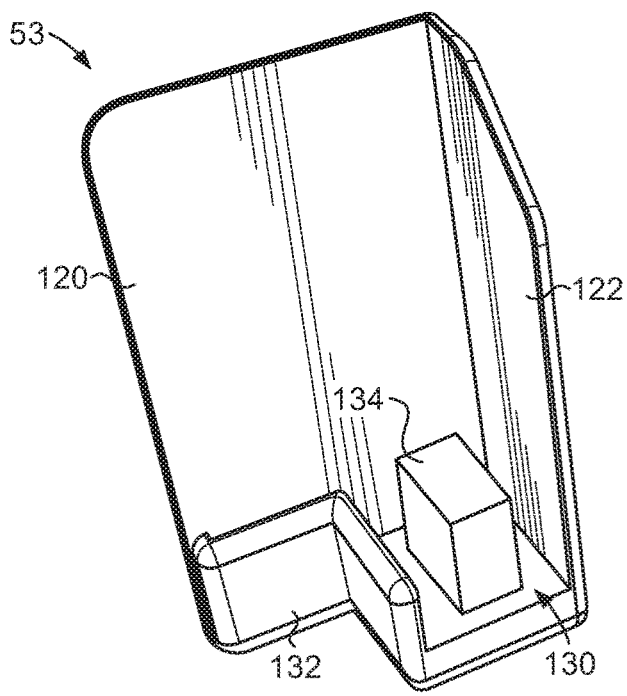
FIGS. 6A-6C illustrate example end caps for use with the under-hood luminaire shown in FIG. 1 according to aspects of the embodiments described herein.
Figure 6B:
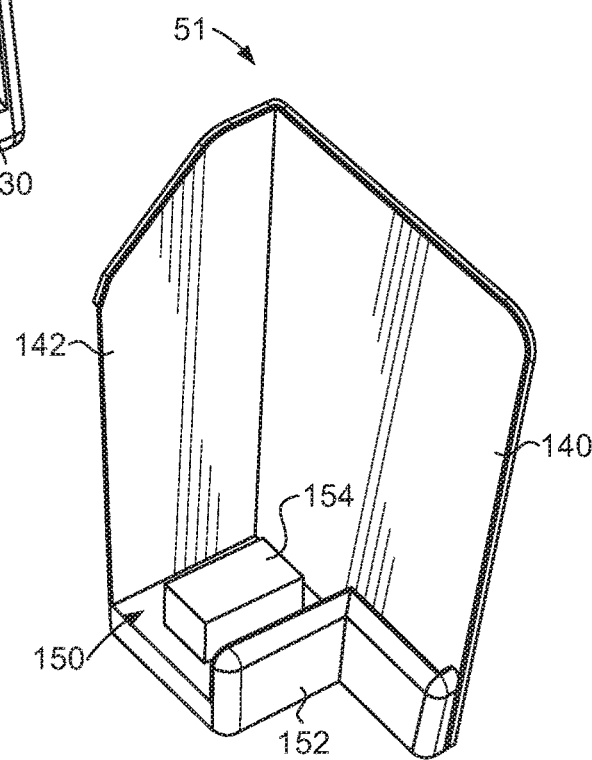
Figure 6C:
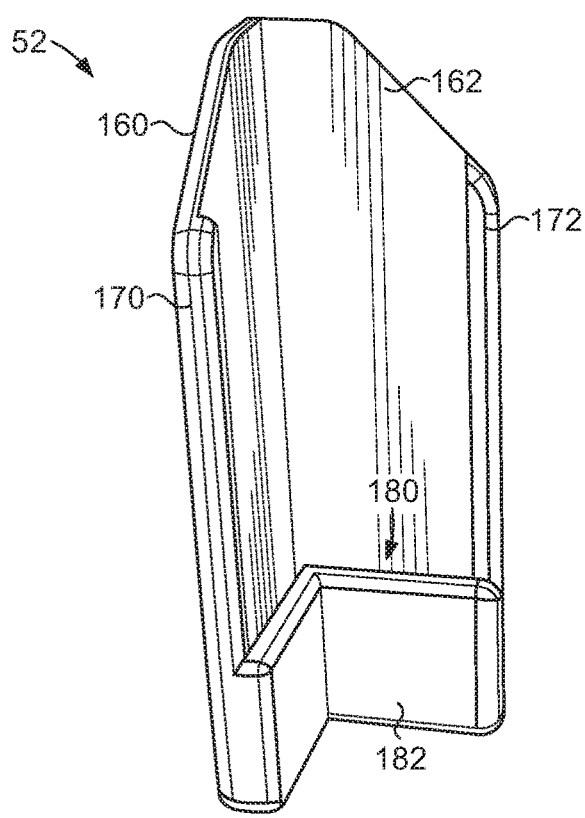

In other aspects of the embodiments, FIGS. 6A-6C illustrate example end caps for use with the luminaire 10 shown in FIG. 1. Particularly, FIG. 6A illustrates an example of the end cap 53, FIG. 6B illustrates an example of the end cap 51, and FIG. 6C illustrates an example of the end cap 52. The end cap 52 shown in FIG. 6C is also representative of the end cap 54, as the end caps 52 and 54 can be the same in one example.

Referring first to FIG. 6A, the end cap 53 is formed to wrap around one distal end of the support brace 22, which has a cross-sectional "P" profile. The end cap 53 includes a first side wall 120, a second side wall 122, a pocket 130 formed in part between the first side wall 120, the second side wall 122, and the pocket wall 132. A plug 134 is formed at a base of the pocket 130. The plug 134 can be press-fitted into a portion of the enclosed area 98 at the one end of the tube 95 (FIG. 4D) in the support brace 22, when the end cap 53 is placed over one end of the support brace 21.

Referring to FIG. 6B, the end cap 51 is formed to wrap around another distal end of the support brace 22. The end cap 51 includes a first side wall 140, a second side wall 142, a pocket 150 formed in part between the first side wall 140, the second side wall 142, and the pocket wall 152. A plug 154 is formed at a base of the pocket 150. The plug 154 can be press-fitted into a portion of the enclosed area 98 the other end of the tube 95 (FIG. 4D) in the support brace 22, when the end cap 51 is placed over one end of the support brace 21.

Referring to FIG. 6C, the end cap 52 includes a first side wall 160, a second side wall 162, and a pocket 180 formed between the first side wall 160, the second side wall 162, and a pocket wall 182. The end cap 52 also includes a first edge round 170 and a second edge round 172. The end cap 52 can be press-fitted and secured over one distal end of the support brace 21, with the distal end of the support brace 21 fitting into the pocket 180. In this arrangement, the edges of the support brace 21 seat along the first edge round 170 and the second edge round 172. The end cap 54, which can be the same or similar in shape to the end cap 52, can also be press-fitted and secured over another distal end of the support brace 21.

Thus, the end caps 51-54 can be secured in place at the ends of the support braces 21 and 22 using a press- or friction-fit as shown in FIGS. 1-3. Additionally or alternatively, adhesives, mechanical fasteners, other suitable means, or combinations thereof can be used to secure the end caps 51-54 at the ends of the support braces 21 and 22. The end caps 51-54 can be formed from plastic, rubber, or other suitable materials.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. An under-hood luminaire, comprising:
    a luminaire frame assembly, the luminaire frame assembly comprising:
        at least two support braces; and
        a plurality of cross members secured to surfaces of the at least two support braces in an unevenly spaced-apart configuration, at least one of the plurality of cross members comprising a mounting surface, the mounting surface extending at an angle with respect to the surfaces of the at least two support braces;
    a contraction hook assembly secured to the at least two support braces; and
    a light strip secured to the mounting surface.

2. The under-hood luminaire of claim 1, wherein the plurality of cross members extend parallel to each other.

3. The under-hood luminaire of claim 1, wherein the contraction hook assembly comprises:
    a first guide tube, a first telescopic hook arm that slides into and out from the first guide tube, and a first tension spring secured within the first guide tube at one end and secured at another end to the first telescopic hook arm; and
    a second guide tube extending parallel to the first guide tube, a second telescopic hook arm that slides into and out from the second guide tube, and a second tension spring secured within the second guide tube at one end and secured at another end to the second telescopic hook arm.

4. The under-hood luminaire of claim 3, wherein:
    the first telescopic hook arm can be pulled out from the first guide tube in a first linear direction under tension by the first tension spring;
    the second telescopic hook arm can be pulled out from the second guide tube in a second linear direction under tension by the second tension spring; and
    the first linear direction is opposite the second linear direction.

5. The under-hood luminaire of claim 4, wherein:
    the first telescopic hook arm comprises a first hook end to catch a right edge of an automobile hood of an automobile;
    the second telescopic hook arm comprises a second hook end to catch a left edge of the automobile hood; and
    under tension due to the first tension spring and the second tension spring, respectively, the first telescopic hook arm and the second telescopic hook arm secure the luminaire frame assembly to the automobile hood.

6. The under-hood luminaire of claim 5, wherein, when the luminaire frame assembly is secured to the automobile hood, the mounting surface faces an engine of the automobile.

7. The under-hood luminaire of claim 1, wherein the mounting surface extends at an angle of about 45° with respect to the surfaces of the at least two support braces.

8. An under-hood luminaire, comprising:
a luminaire frame assembly, the luminaire frame assembly comprising:
at least two support braces; and
a plurality of cross members secured to the at least two support braces in a spaced-apart configuration, at least one of the plurality of cross members comprising a mounting surface;
a contraction hook assembly secured to the at least two support braces; and
a light strip secured to the mounting surface, wherein:
at least one of the plurality of cross members comprises an extruded channel formed from aluminum; and
the mounting surface extends within the extruded channel.

9. An under-hood luminaire, comprising:
a luminaire frame assembly, the luminaire frame assembly comprising:
at least two support braces; and
a plurality of cross members secured to the at least two support braces in a spaced-apart configuration, at least one of the plurality of cross members comprising a mounting surface;
a contraction hook assembly secured to the at least two support braces; and
a light strip secured to the mounting surface, wherein at least one of the plurality of cross members comprises a curved lip edge.

10. A luminaire, comprising:
a luminaire frame assembly, the luminaire frame assembly comprising:
at least two support braces; and
at least two cross members secured to surfaces of the at least two support braces in a spaced-apart configuration, at least one of the at least two cross members comprising a mounting surface, the mounting surface extending at an angle with respect to the surfaces of the at least two support braces; and
a light strip secured to the mounting surface.

11. The luminaire of claim 10, wherein:
the at least two cross members comprise a plurality of cross members; and
the plurality of cross members extend parallel to each other.

12. The luminaire of claim 11, wherein the plurality of cross members are secured to the at least two support braces in an unevenly spaced-apart configuration.

13. The luminaire of claim 10, further comprising:
a contraction hook assembly, wherein the contraction hook assembly comprises:
a first guide tube, a first telescopic hook arm that slides into and out from the first guide tube, and a first tension spring secured within the first guide tube at one end and secured at another end to the first telescopic hook arm; and
a second guide tube extending parallel to the first guide tube, a second telescopic hook arm that slides into and out from the second guide tube, and a second tension spring secured within the second guide tube at one end and secured at another end to the second telescopic hook arm.

14. The luminaire of claim 13, wherein:
the first telescopic hook arm can be pulled out from the first guide tube in a first linear direction under tension by the first tension spring;
the second telescopic hook arm can be pulled out from the second guide tube in a second linear direction under tension by the second tension spring; and
the first linear direction is opposite the second linear direction.

15. The luminaire of claim 14, wherein:
the first telescopic hook arm comprises a first hook end to catch a right edge of an automobile hood of an automobile;
the second telescopic hook arm comprises a second hook end to catch a left edge of the automobile hood; and
under tension due to the first tension spring and the second tension spring, respectively, the first telescopic hook arm and the second telescopic hook arm secure the luminaire frame assembly to the automobile hood.

16. The luminaire of claim 15, wherein, when the luminaire frame assembly is secured to the automobile hood, the mounting surface faces an engine of the automobile.

17. A luminaire, comprising:
a luminaire frame assembly, the luminaire frame assembly comprising:
at least two support braces; and
a plurality of cross members secured to surfaces of the at least two support braces in an unevenly spaced-apart configuration, each of the plurality of cross members comprising a mounting surface extending at an angle with respect to the surfaces of the at least two support braces; and
a light strip secured to each mounting surface of the plurality of cross members.

18. The luminaire of claim 17, wherein the plurality of cross members extend parallel to each other.

19. The luminaire of claim 17, wherein at least one of the plurality of cross members comprises a curved lip edge.

20. The luminaire of claim 17, wherein at least one outer surface of the plurality of cross members is coated to reduce reflections.

* * * * *